Figure 1:
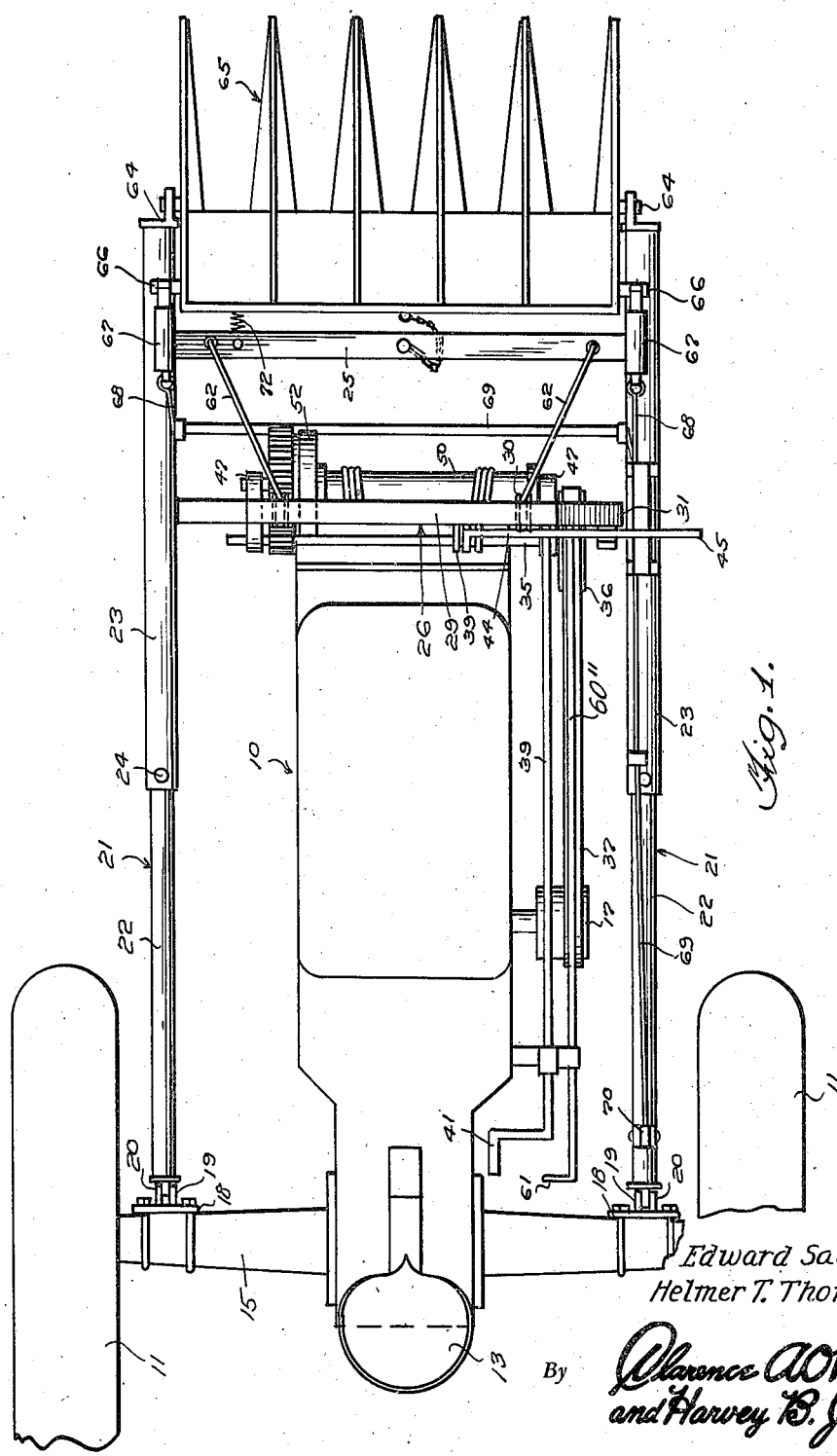

Nov. 30, 1948.  E. SADUSKY ET AL  2,455,093
HOIST ATTACHMENT FOR TRACTORS
Filed June 1, 1946  3 Sheets-Sheet 1

Inventors
Edward Sadusky
Helmer T. Thompson,

By Clarence A. O'Brien
and Harvey B. Jacobson
Attorneys

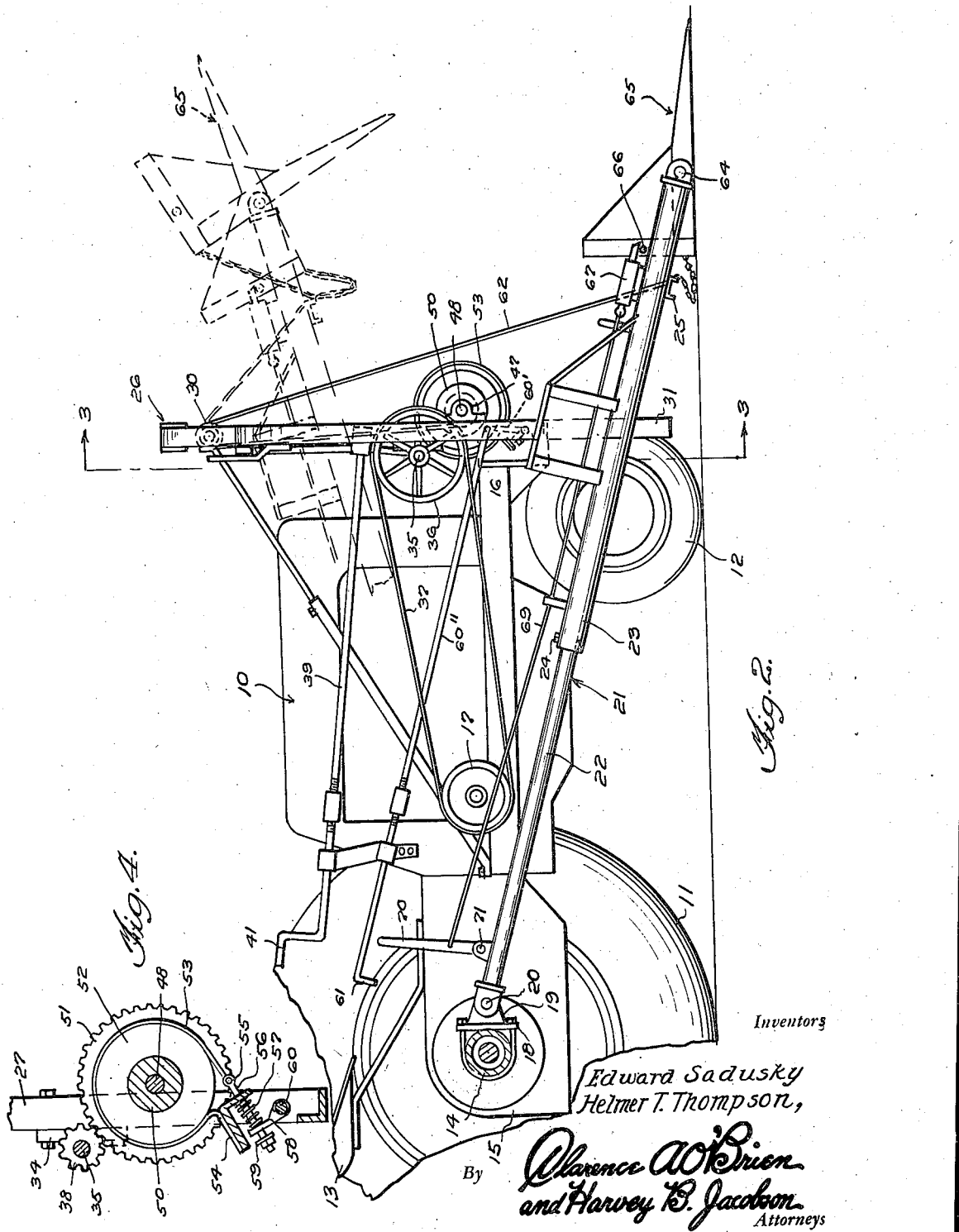

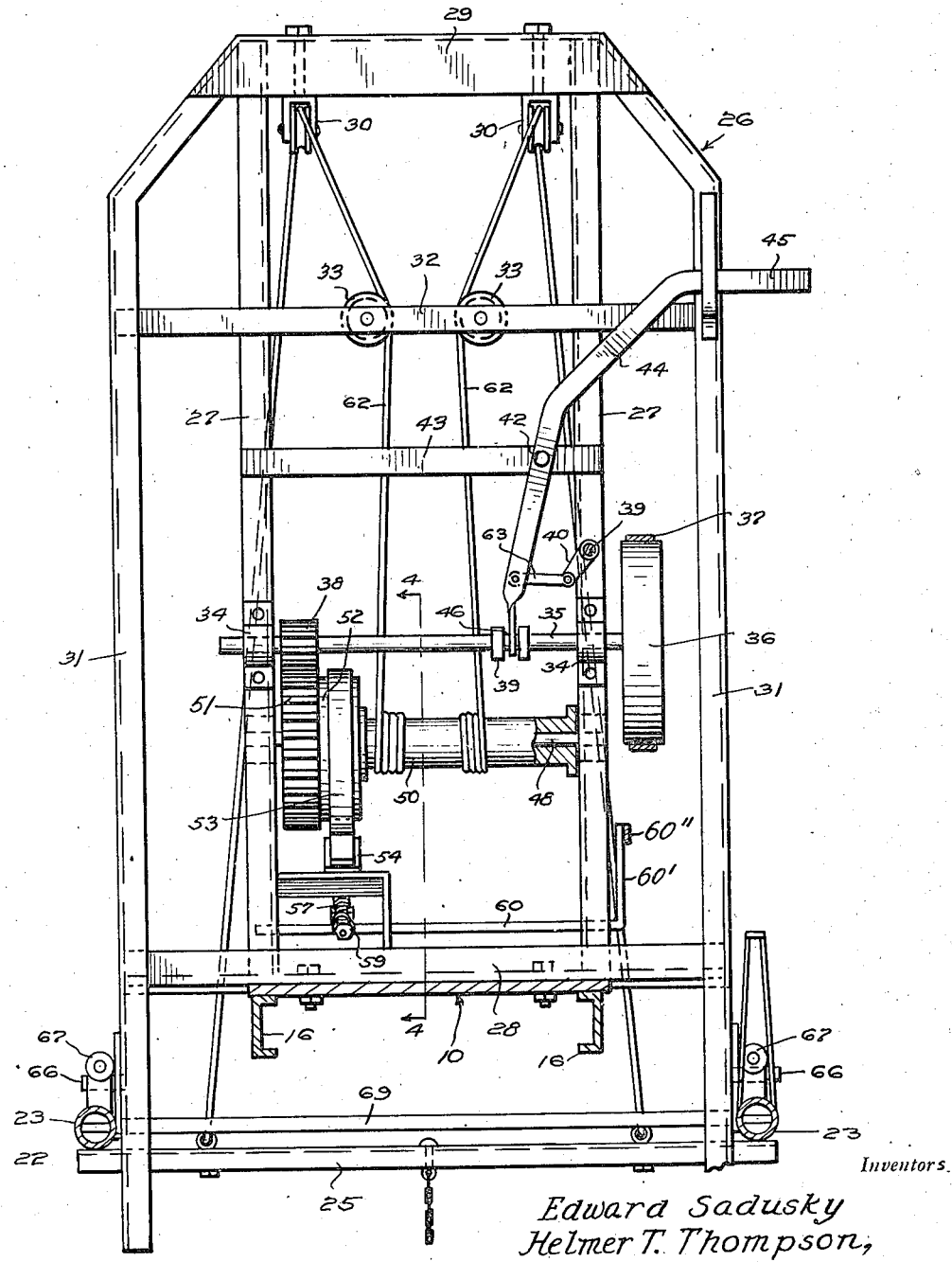

Patented Nov. 30, 1948

2,455,093

UNITED STATES PATENT OFFICE 2,455,093

HOIST ATTACHMENT FOR TRACTORS

Edward Sadusky and Helmer T. Thompson,
Staples, Minn.

Application June 1, 1946, Serial No. 673,799

2 Claims. (Cl. 214—140)

This invention relates to a hoist attachment for tractors and has for its primary object to equip an ordinary tractor for lifting heavy loads and transporting them from one place to another.

Another object is to equip a farm tractor for use as a shovel, hay bucker and loader and for stacking hay, pulling fence posts and a myriad of other uses about a farm, or any industry where the lifting and transportation of heavy loads is required.

The above and other objects may be attained by employing this invention which embodies among its features a pair of lift arms adapted to be pivoted adjacent opposite ends of the rear axle of a tractor having a power take-off, said arms extending forwardly in spaced parallel relation on opposite sides of the tractor and terminating beyond the front end thereof, a hoist frame adapted to be attached to the front end of the tractor, winding drums mounted in said hoist frame to rotate about a horizontal axis, manually controlled means to establish driving connection between the power take-off and the winding drums, a cable attached to each lift arm and to each drum to cause the lift arms to be elevated when the drums are rotated and a brake associated with the drums to prevent reverse rotation thereof when driving connection between the power take-off and the drums is discontinued.

Other features include means automatically to interrupt the driving connection between the power take-off and the winding drums when the forward ends of the lift arms attain a predetermined height and manually actuated means to release the brake to lower the lift arms.

Still other features include a load support pivoted between the forward ends of the lift arms and a latch releasably to hold the load support in load sustaining position with relation to the lift arms.

In the drawings:

Figure 1 is a top plan view of a tractor equipped with this improved hoist attachment, Figure 2 is a side view of Figure 1, Figure 3 is an enlarged sectional view taken substantially on the line 3—3 of Figure 2, and Figure 4 is a sectional view taken substantially along the line 4—4 of Figure 3.

Referring to the drawings in detail a tractor designated generally 10 is equipped with the customary drive wheels 11, steering wheel 12 and driver's or operator's seat 13. The drive wheels 11 are mounted on a conventional axle 14 housed within a conventional axle housing 15 at the rear end of the tractor. The forward end 16 of the frame of the tractor protrudes slightly beyond the forward end of the engine hood in a conventional manner and the tractor is equipped with a conventional power take-off pulley 17 which is driven by the tractor engine in a conventional manner.

Clamped to the axle housing 15 adjacent opposite ends are supporting plates 18 carrying forwardly extending ears 19 to each of which is pivoted as at 20 a lift arm designated generally 21. Each lift arm 21 comprises telescopic members 22 and 23 which are held in longitudinally adjusted position in any suitable manner as by set screws 24, and these lift arms project forwardly in spaced parallel relation on opposite sides of the tractor 10 and for some distance beyond the forward end of the tractor. These arms 21 are connected adjacent their forward ends by means of a cross bar 25 so as to form a substantially U-shaped frame which embraces the forward end and opposite sides of the tractor.

Supported at the forward end of the frame extension 16 of the tractor is a hoist frame designated generally 26 which comprises a pair of standards 27 joined at their lower ends by a transversely extending supporting bar 28, and at their upper ends by a cross bar 29 adjacent opposite end of which are suspended sheaves 30 the purpose of which will be more fully hereinafter explained. Secured to opposite ends of the supporting bar 28 and extending upwardly therefrom in spaced parallel relation to the standards 27 are vertically extending guide bars 31, the outer faces of which serve as guides for the forward ends of the lift arms 21. A supporting bar 32 extends across the frame formed by the bar previously described in spaced parallel relation with and intermediate the supporting bar 28 and the cross bar 29. Sheaves 33 are rotatably supported by the bar 32 and form guide rollers for the cables to be more fully hereinafter described.

Rotatably mounted in suitable bearings 34 attached to the front faces of the standards 27 is a main drive shaft 35 carrying at one end a drive pulley 36 which has driving connection through the medium of a drive belt 37 with the pulley 17 and the power take-off of the tractor. Mounted to rotate with but slide longitudinally of the drive shaft 35 is a drive pinion 38 the longitudinal movements of which are controlled by means of a groove in the sleeve 39 which surrounds the shaft 35 and rotates therewith but slides longitudinally thereon. Journaled in one of the standards 27 is a rock shaft 39 carrying adjacent the end which is journaled in the frame 26 a lever arm 40, and carried at the end of the shaft 39 opposite the lever arm is a hand crank 41 which is preferably situated within easy reach of the occupant of the seat 13. Pivotally supported as at 42 on a cross bar 43 extending between the standards 27 is a stop lever 44 one end of which projects upwardly and outwardly and terminates in horizontal extension 45 which lies in the path of movement of one of the arms 21. This lever 44 is provided at the end opposite the extension 45 with a fork 46 which is adapted to ride in the groove of the sleeve 39 so that as the lever 44 is rocked about its pivot 42 the sleeve will be moved longitudinally of the shaft 35 to move the pinion 38 longitudinally therewith.

Rotatably supported in bearings 47 on the forward faces of the columns 27 is a shaft 48 carrying a winding drum 50. Keyed or otherwise connected to the shaft 48 adjacent one end thereof is a drive gear 51 which is adapted to mesh with drive pinion 38 previously described so that when the sleeve 39 is moved to the left in Figure 3 the pinion 38 will mesh with the gear 51 to impart rotary motion to the shaft 48 and hence to the drum 50. Keyed or otherwise secured to the shaft 48 adjacent the drive gear 51 is a brake drum 52 which is surrounded by the brake band 53. One end of the band is anchored to a suitable bracket at 54, while the opposite end is connected as at 55 to a push rod 56 which is slidably mounted in the bracket 54, and is surrounded by a compression coil spring 57, one end of which bears against the bracket, while the opposite end bears against a lever arm 58 which in turn abuts a suitable adjustable stop 59 carried by the push rod 56. It will thus be seen that when the brake drum 52 rotates in one direction the action of the brake band 53 will be ineffective to stop or retard rotation of the shaft 48, but when the shaft 48 is influenced to rotate in the opposite direction the brake band 53 will set, and lock the drum 52 and the parts connected therewith against such rotation. The lever arm 58 is keyed or otherwise attached to a rock shaft 60 journaled in one of the uprights 27. This rock shaft 60 carries an upwardly extending lever arm 60' to the upper end of which is attached a pull rod 60" which extends toward the rear of the tractor and terminates in an angularly extending handle member 61 located within easy reach of the occupant of the seat 13. It will thus be seen that by exerting pull on the handle 61 the shaft 60 will be rocked about its longitudinal axis, to cause the arm 58 to be moved in a direction to compress the spring 57 and thus permit free rotation of the drum 52 within the band 53.

Secured in any suitable manner to the lift arms 21 adjacent their forward ends are cables 62, the opposite ends of which are trained upwardly over the sheaves 30 and thence downwardly over the sheaves 33 to be attached to the drum 50. It will thus be seen that as the drum 50 rotates, the cables 62 will be wound thereon and as a consequence thereof will elevate the lift arms 21. A suitable link 63 is pivoted to the end of the arm 40 opposite that connected to the shaft 39, and the opposite end of the link 63 is pivoted to the lever 44 adjacent the fork 46 it will thus be seen as the crank 41 is rotated the lever 44 will be moved to slide the sleeve 39 longitudinally of the shaft 35 and hence move the pinion 38 into and out of meshing engagement with the gear 51.

Pivotally supported on suitable brackets 64 at the extreme forward ends of the lift arms 21 is a suitable load elevating device designated generally 65 which is preferably so constructed that the bulk of the load will be in advance of the pivot thereof. This load elevating device is provided adjacent its rear end with laterally projecting lugs 66, and attached in any suitable manner to the lift arms 21 adjacent their forward ends are latches 67 connected in any suitable manner as by flexible connection 68 upwardly extending lever secured to opposite ends of a transversely extending rock shaft 69. Connected to one of said levers and extending rearwardly along one of the lift arms 21 is a cable or like flexible member 69, the opposite end of which is connected to a lever 70 which is pivotally mounted as at 71 on the lift arm 21 along which the flexible member 69 extends. The lever 70 is located so as to be within easy reach of the occupant of the seat 13.

In use it will be understood that the drive wheel 36 is driven through the medium of the belt 37 from the power take-off 17 of the tractor. Upon rocking the shaft 39 the pinion 28 may be slid laterally of the machine to mesh with the drive gear 51 so as to set the shaft 48 into motion and wind the cables 62 on the drum 50. This will cause the lift arms 21 to swing upwardly about their pivots 20 and hence elevate any load that may be carried in the load elevating device 65. Upon disengaging the pinion 38 from the gear 51 the drum 50 will be held against rotation due to the contraction of the band 53 under the influence of the spring 57. The load may thus be sustained in an elevated position until such time as it is desired to discharge it whereupon the lever 70 may be manipulated to withdraw the latches so as to permit the load sustaining bucket 65 to tilt as suggested by the dotted lines in Figure 2 and discharge the load. Upon the discharge of the load the load sustaining bucket will return to its initial position under the influence of retractile coil springs 72 which extend between the rear end of the load elevating device and the cross bar previously described. Should the operator fail to disconnect the drive pinion 38 on the drive gear 51 so that the cables 62 continue winding, and lifting the lift arms, the device will automatically be stopped when the extension 45 of the lever 44 is engaged by the lift arm on that side of the machine. Continued upward movement of the lift arm will cause the lever 44 to rock about its pivot 42 and move the fork 46 and hence the sleeve 39 and pinion 38 into a position to disengage the pinion from the drive gear 51. As a result the load will come to rest in an elevated position and will be so held until manually released by the operator rocking the shaft 60 so as to release the tension of the spring 57 and thus relinquish the hold of the brake band about the drum 52.

While in the foregoing there has been shown and described the preferred embodiment of this invention it is to be understood that minor changes in the details of construction, combination and arrangement of parts may be resorted to without departing from the spirit and scope of the invention as claimed.

We claim:

1. A hoist attachment for a tractor which includes a pair of lift arms adapted to be pivoted adjacent opposite ends of the rear axle of a tractor having a power take-off, said arms extending forwardly in spaced parallel relation on opposite sides of the tractor and terminating beyond the front end thereof, a hoist frame adapted to be attached to the front end of the tractor. a winding drum mounted in said hoist frame to rotate about a horizontal axis, a drive gear and a brake drum coupled to the winding drum to rotate therewith, a longitudinally shiftable drive shaft mounted to rotate in the hoist frame above the winding drum, a drive pinion fixed to the drive shaft to move therewith into and out of meshing engagement with the drive gear, means establishing driving connection between the drive shaft and the power take-off of the tractor, a lever pivoted to the lift frame above the drive shaft to swing in an arc which lies in a plane with the axis of the drive shaft, means coupling one end of the lever with the drive shaft to cause the shaft to move longitudinally and shift the pinion into or out of meshing engagement with the gear, a lateral extension on the lever at the end remote from the drive shaft for engagement by a lift arm when the lift arms reach their upper limit of travel to shift the pinion out of meshing engagement with the gear and manually actuated means coupled to the lever for moving it and causing the shaft to shift and move the drive pinion into or out of meshing engagement with the gear.

2. A hoist attachment for a tractor which includes a pair of lift arms adapted to be pivoted adjacent opposite ends of the rear axle of a tractor having a power take-off, said arms extending forwardly in spaced parallel relation on opposite sides of the tractor and terminating beyond the front end thereof, a hoist frame adapted to be attached to the front end of the tractor, a winding drum mounted in said hoist frame to rotate about a horizontal axis, a drive gear and a brake drum coupled to the winding drum to rotate therewith, a longitudinally shiftable drive shaft mounted to rotate in the hoist frame above the winding drum, a drive pinion fixed to the drive shaft to move therewith into and out of meshing engagement with the drive gear, means establishing driving connection between the drive shaft and the power take-off of the tractor, a lever pivoted to the lift frame above the drive shaft to swing in an arc which lies in a plane with the axis of the drive shaft, means coupling one end of the lever with the drive shaft to cause the shaft to move longitudinally and shift the pinion into or out of meshing engagement with the gear, a lateral extension on the lever at the end remote from the drive shaft for engagement by a lift arm when the lift arms reach their upper limit of travel to shift the pinion out of meshing engagement with the gear and manually actuated means coupled to the lever for moving it and causing the shaft to shift and move the drive pinion into or out of meshing engagement with the gear, a brake band encircling the brake drum, yielding means to hold the brake band contracted about the brake drum and manually actuated means to compress the yielding means and free the brake drum.

EDWARD SADUSKY.
HELMER T. THOMPSON.

REFERENCES CITED

The following references are of record in the file of this patent:

UNITED STATES PATENTS

| Number | Name | Date |
|---|---|---|
| 1,785,119 | Gorsuch et al | Dec. 16, 1930 |
| 1,190,164 | Seyller | Feb. 13, 1940 |
| 2,242,860 | Huelle | May 20, 1941 |
| 2,306,474 | Tieslau | Dec. 29, 1942 |
| 2,402,071 | Nehring | June 11, 1946 |